United States Patent
Radandt et al.

(10) Patent No.: US 6,170,649 B1
(45) Date of Patent: Jan. 9, 2001

(54) INTERLOCKED CONVEYOR FRAME

(75) Inventors: Randel L. Radandt; Charles E. Leher; Keith J. Knepfel, all of Oshkosh, WI (US)

(73) Assignee: Arrowhead Systems LLC, Randolph, WI (US)

( * ) Notice: Under 35 U.S.C. 154(b), the term of this patent shall be extended for 0 days.

(21) Appl. No.: 09/436,134

(22) Filed: Nov. 9, 1999

(51) Int. Cl.[7] .................................................. B56G 21/00
(52) U.S. Cl. ............................................................. 198/860.1
(58) Field of Search ................................. 198/841, 860.1, 198/861.1

(56) References Cited

U.S. PATENT DOCUMENTS

| | | | |
|---|---|---|---|
| 4,562,921 | * | 1/1986 | Leemkuil et al. ............ 198/860.1 X |
| 5,137,145 | * | 8/1992 | Clopton ......................... 198/860.1 X |
| 5,562,202 | * | 10/1996 | Newcomb et al. ............ 198/860.1 X |
| 5,601,180 | * | 2/1997 | Steeber et al. .................... 198/841 X |
| 5,971,137 | * | 10/1999 | Grant et al. .................... 198/860.1 X |

FOREIGN PATENT DOCUMENTS

| | | | |
|---|---|---|---|
| 409379 | * | 1/1991 | (EP) .................................. 198/860.1 |
| 562544 | * | 9/1993 | (EP) .................................. 198/860.1 |

* cited by examiner

*Primary Examiner*—James R. Bidwell
(74) *Attorney, Agent, or Firm*—Michael Best & Friedrich LLP

(57) ABSTRACT

The present invention relates to a conveyor frame assembly that does not require the use of conventional fasteners and/or welded joints in order to be assembled. The frame assembly includes a base having a slot and a support having a tab extending through the slot. The tab is plastically deformed toward the base in order to couple the support to the base. The invention also relates to a method of assembling a conveyor frame. The method includes inserting a tab on a support into a slot on a base and then coupling the support to the base by plastically deforming the tab toward the base. The invention also relates to a tool for assembling a conveyor frame that includes a base and a support. The tool includes a head that is adapted to be inserted into a slot in the base after a tab on the support has been inserted into the slot. The base and the support are coupled together by impacting the tool further through the slot until an angled surface on the tool plastically deforms the tab toward the base. In another form the tool includes a head that is adapted to be positioned about the tab and a handle that is positioned adjacent to the head. The tool plastically deforms the tab toward the base by maneuvering the handle tool transverse to the tab after the head is positioned about the tab.

29 Claims, 9 Drawing Sheets

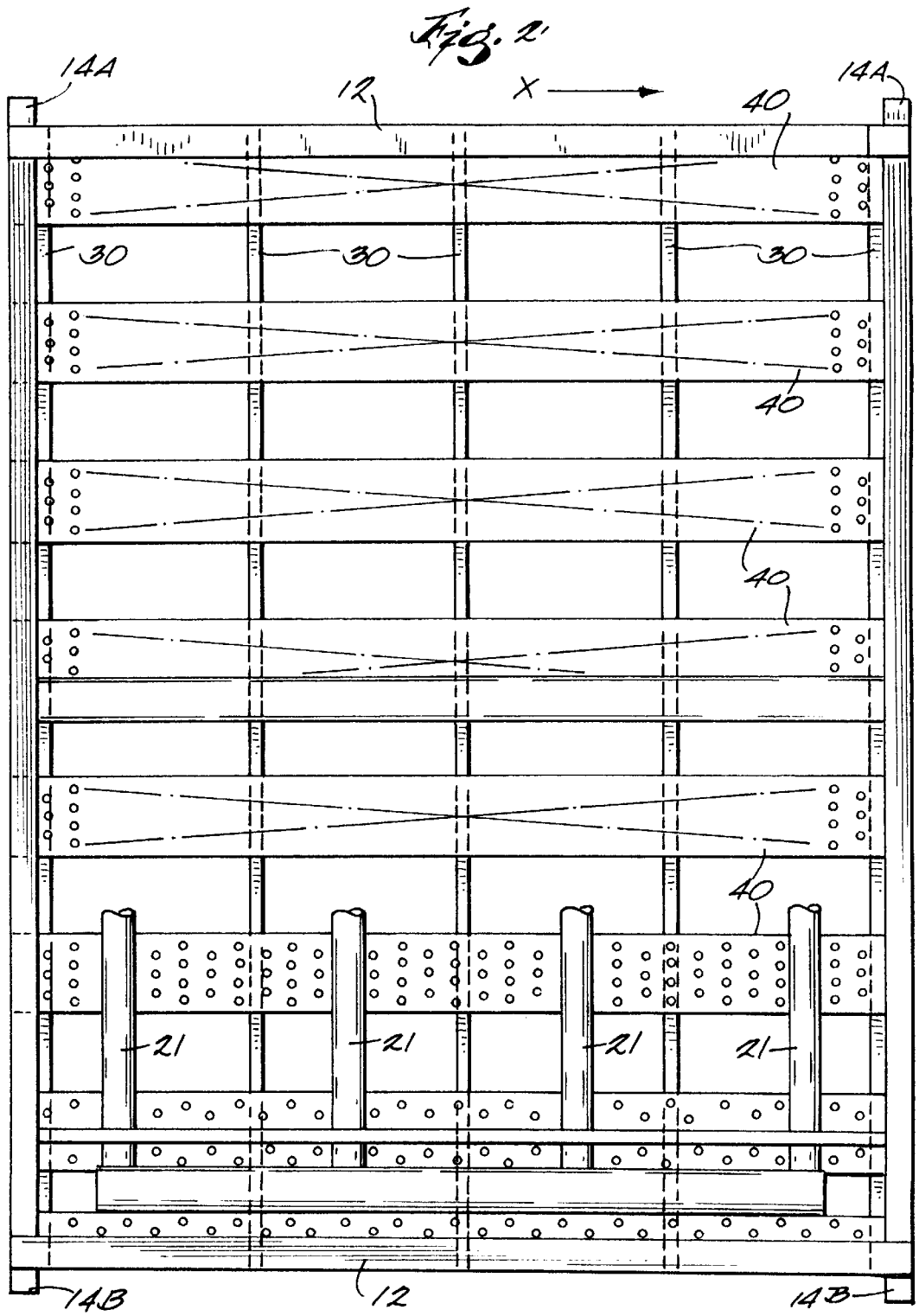

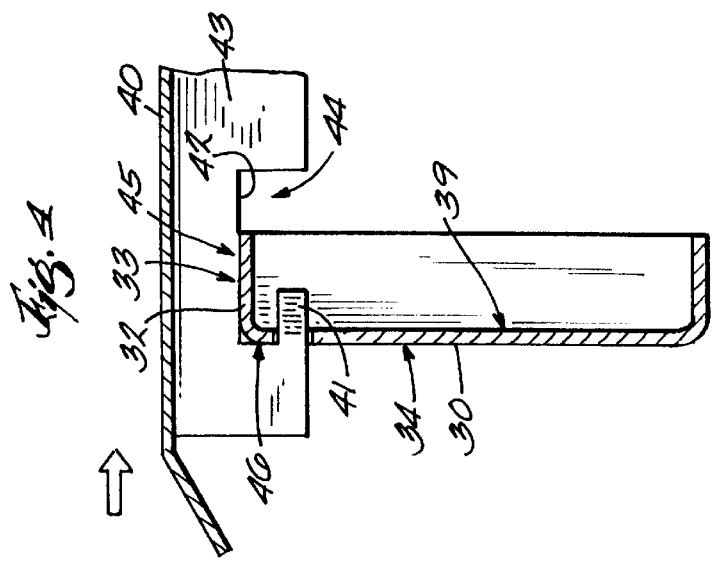
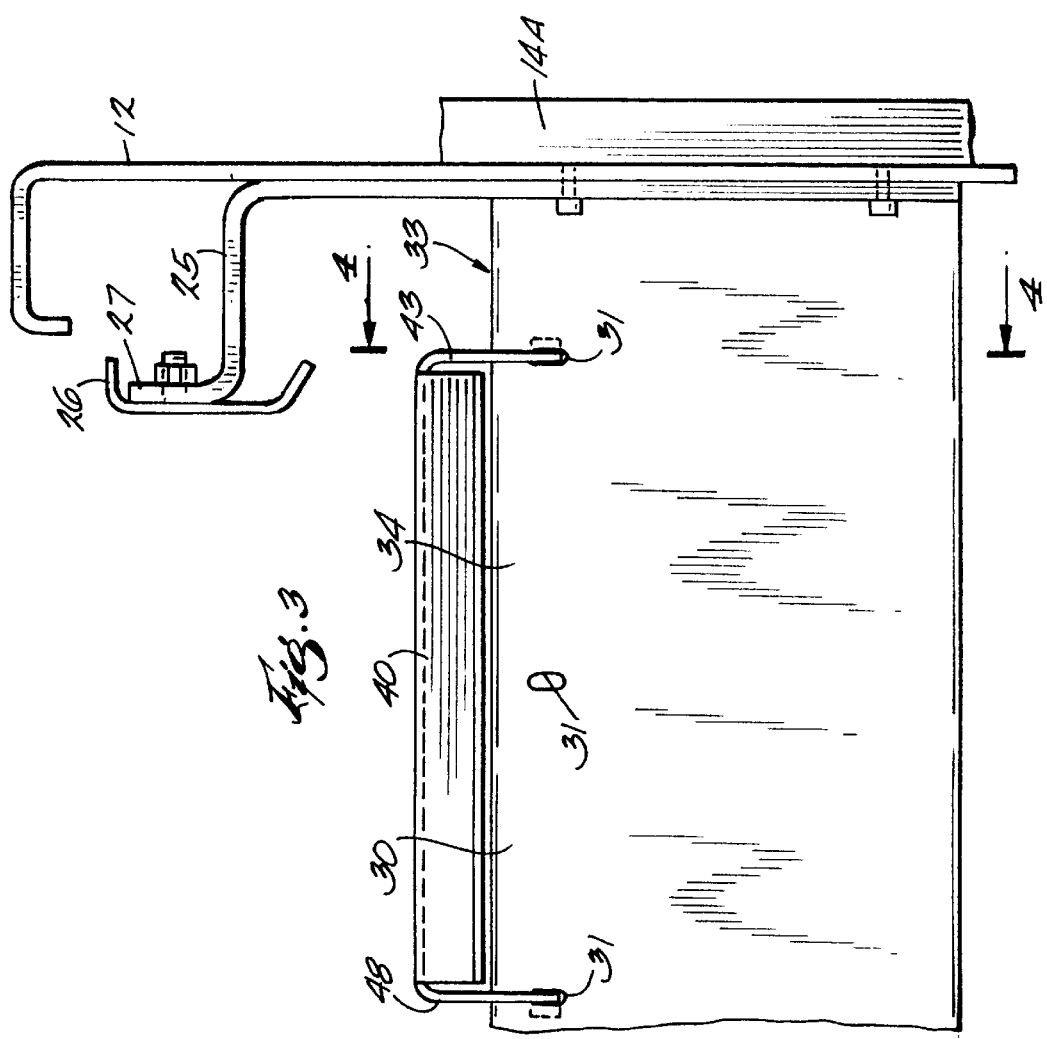

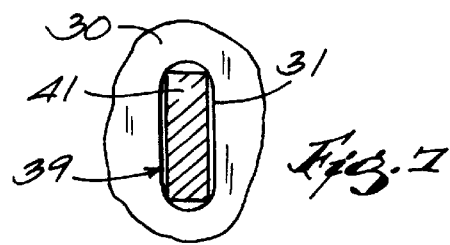
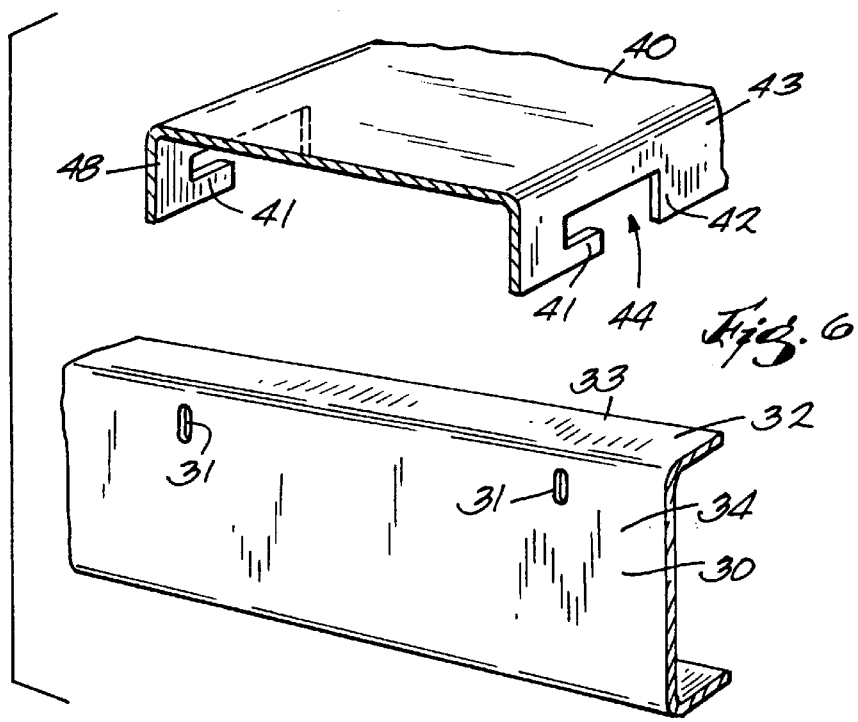
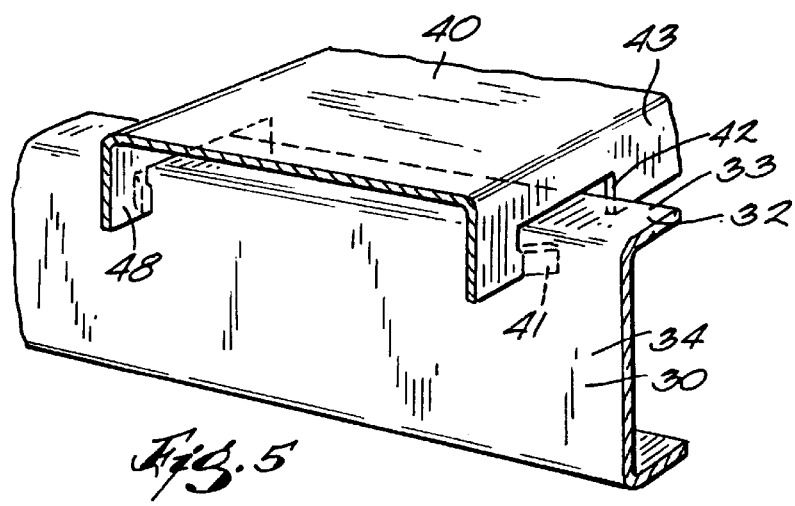

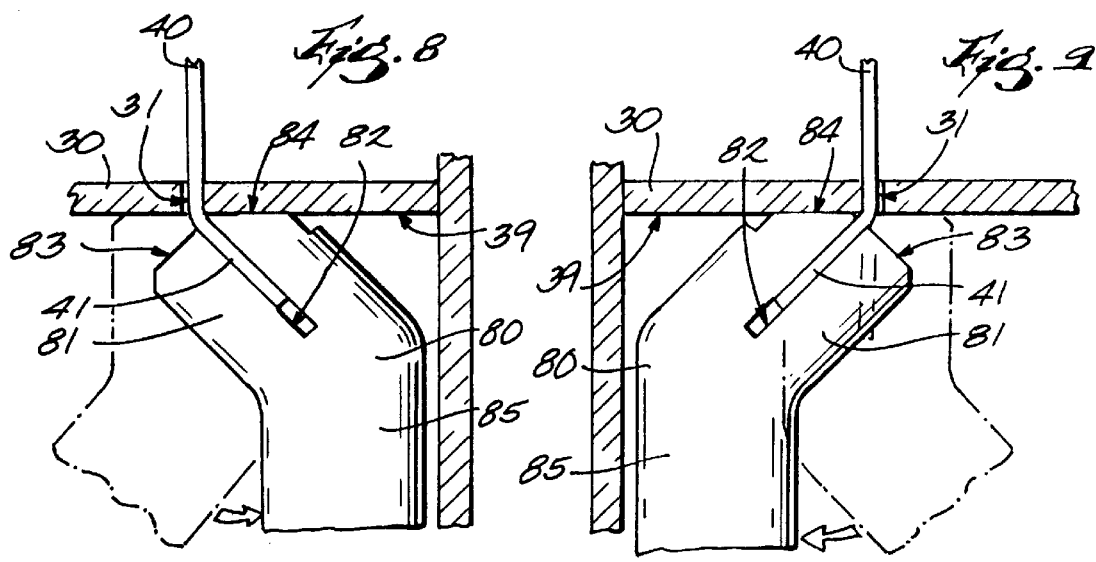
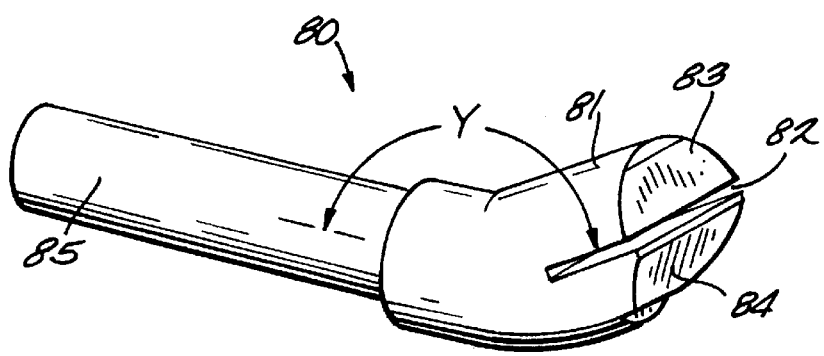

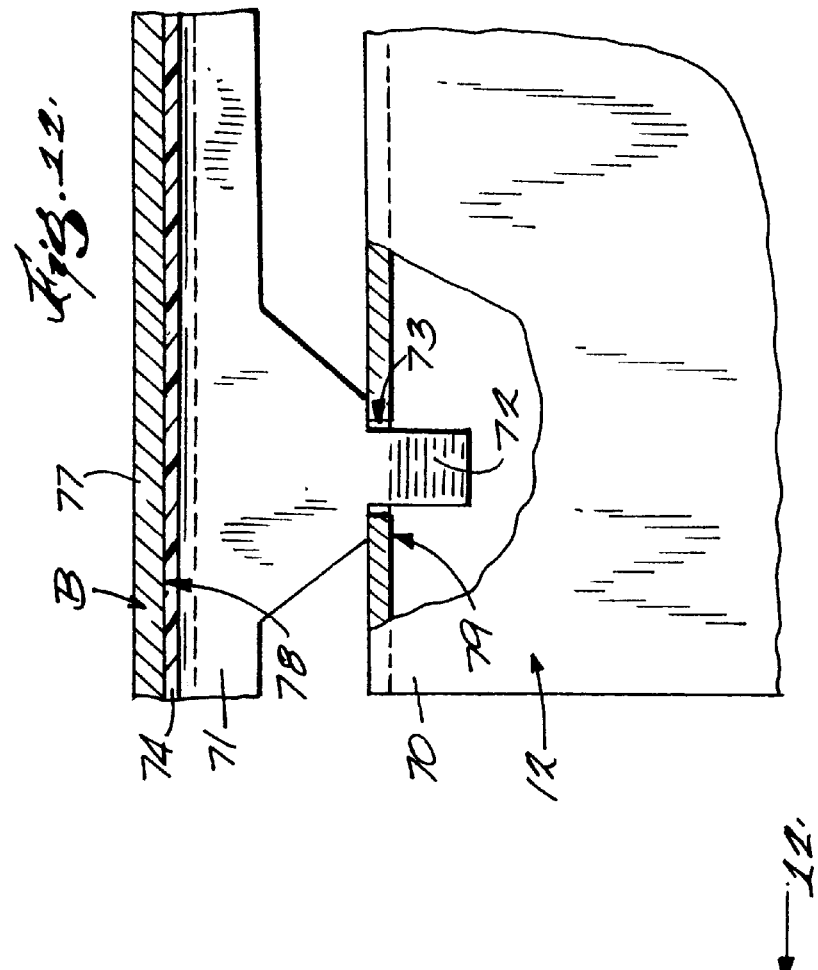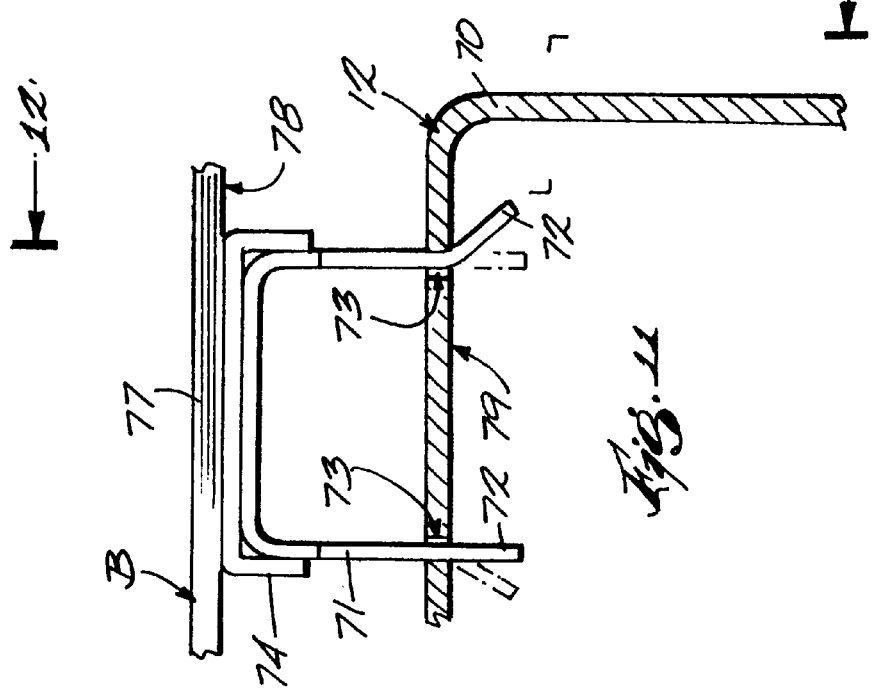

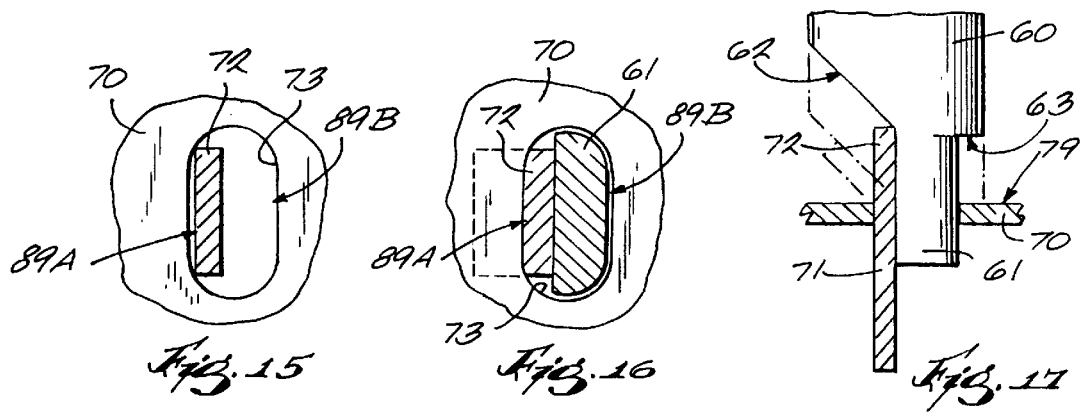
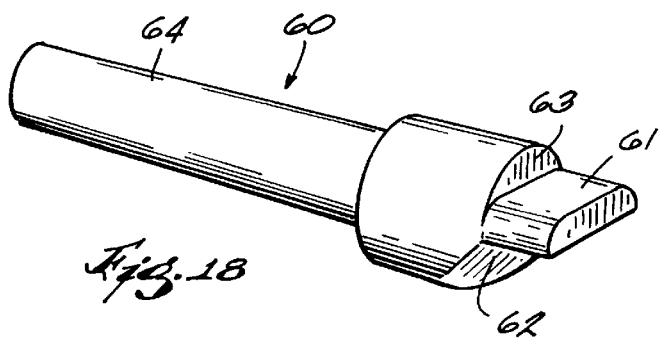

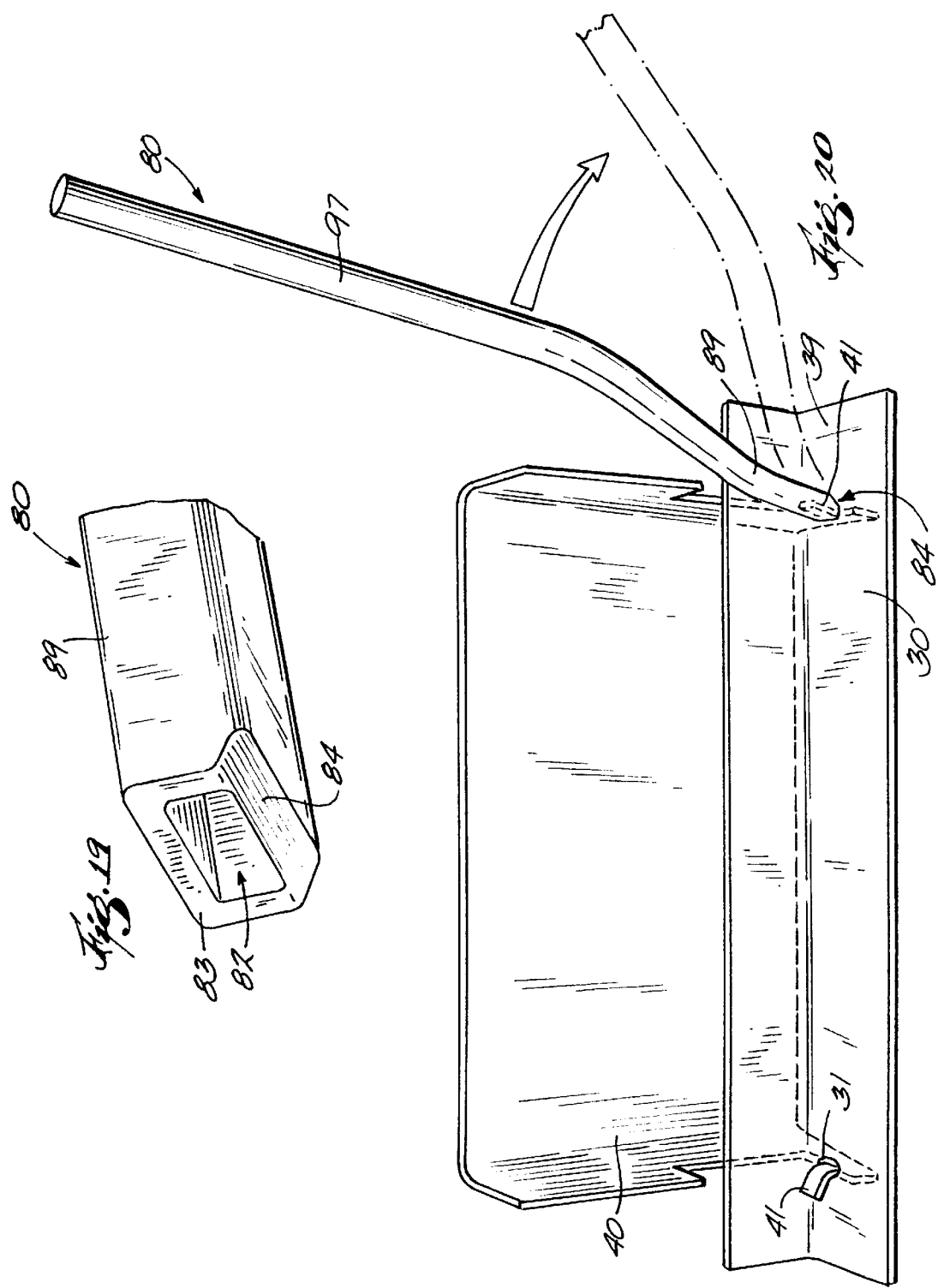

INTERLOCKED CONVEYOR FRAME

FIELD OF THE INVENTION

This invention relates to a conveyor frame assembly, and more particularly to a conveyor frame assembly that is put together without using conventional tools and mounting hardware.

BACKGROUND OF THE INVENTION

Conveyors are routinely used in most manufacturing facilities, warehouses, and distribution centers to transport products, or articles of production, from one location to another. The conveyors include endless conveyor belt which is supported by a frame. The conveyor belt is typically driven by a motor that is mounted to the frame. A conveyor frame needs to be solidly constructed so that it provides adequate support to the conveyor belt.

A typical conveyor frame includes side supports, cross-members and either bed channels or a platform depending on the design of the frame and the type of conveyor belt supported by the frame. Conveyors having modular conveyor belts often include frames that have cross-members extending transverse to the conveyor path and bed channels extending along the conveyor path. Another known type of conveyor includes a unit link chain belt that travels along and is supported by wear strips engaging the underside of the belt. The wear strips are mounted on wear strip support brackets that are usually mounted on a platform or other supporting member that is part of the frame. The cross-members, side supports, bed channels and wear strip brackets are commonly connected together using a combination of conventional fasteners (e.g., threaded nuts and bolts) and welded joints. The physical configuration of an individual conveyor frame is determined by such factors as conveyor size, the type of belt required, floor space and the size of the articles being transported.

SUMMARY OF THE INVENTION

Conventional conveyor frames include a number of structural members that are interconnected by conventional mounting hardware and/or welded joints. One of the problems associated with known conveyor frame assembly constructions is that the frame assemblies are somewhat difficult to assemble. The various components of the frame are often heavy and cumbersome making them difficult to hold in place as they are fastened together. In addition, the fasteners and welded joints are often located in positions that are difficult to access (e.g., under a frame member, or between two closely-spaced components) with assembly tools.

These aspects of known conveyor frame assemblies present problems which arise when the frame assemblies require repair or maintenance, or if the frame assembly needs to be modified or disassembled. Also, using conventional fasteners to interconnect a frame assembly creates the need for closely-held tolerances during manufacture of the frame assembly components thereby increasing the cost of manufacturing the conveyor and the likelihood of difficulties arising during assembly of the conveyor frame.

The present invention is embodied in a conveyor frame assembly that does not use conventional fasteners and/or welded joints to interconnect the frame members. The frame assembly includes a base having a slot and a support having a tab extending through the slot. The tab is plastically deformed toward the base in order to couple the support to the base. The tab and slot configuration provides for simple and accurate location and support of the frame components during assembly of the frame because once the tabs and slots are aligned, the frame components properly positioned. Moreover, once the tab is deformed, the base and support are securely interconnected.

In another aspect, the present invention is embodied in a method of assembling a conveyor frame assembly. The method includes the step of inserting a tab on a support into a slot on a base. The method further includes the step of coupling the support to the base by plastically deforming the tab toward the base. The tab and slot configuration is an easily assembled and disassembled connection, especially when compared to welded joints.

The present invention is also embodied in a tool for assembling a conveyor frame that includes a base and a support. The tool includes a head that is adapted to be inserted into a slot in the base after a tab on the support has been inserted through the slot. The base and the support are coupled together by impacting the tool further through the slot until an angled surface on the tool plastically deforms the tab toward the base.

In yet another aspect, the present invention is embodied in a tool for assembling a conveyor frame that includes a base and a support. The tool includes a head that is adapted to engage a tab that is located on the support and extends through a slot in the base. The tool further includes a handle that is positioned adjacent to the head. The tool plastically deforms the tab toward the base by maneuvering the handle of the tool transverse to the tab after the head is positioned about the tab.

Other features and advantages of the invention will become apparent to those skilled in the art upon review of the following detailed description, claims and drawings.

BRIEF DESCRIPTION OF THE DRAWINGS

FIG. 2 is a top view of the conveyor shown in FIG. 1.

FIG. 3 is an enlarged side view of a portion of the frame assembly shown in FIG. 1.

FIG. 4 is a section view of the portion of the frame assembly shown in FIG. 3 taken along line 4—4.

FIG. 5 is a perspective view of a portion of the frame assembly shown in FIG. 1.

FIG. 6 is a perspective view of the portion of the frame assembly shown in FIG. 5 with the frame assembly disassembled.

FIG. 7 is a side view of a tab and slot configuration used in the frame assembly of the present invention.

FIG. 8 is a partial section view of a tool of the present invention after the tool has plastically deformed a tab.

FIG. 9 is a partially section view of the tool of FIG. 8 after the tool has plastically deformed a tab positioned on an opposite side of a frame assembly.

FIG. 10 is a perspective view of the tool shown in FIG. 8.

FIG. 11 is a partially sectioned side view of a portion of another embodiment of the frame assembly.

FIG. 12 is a section view of the portion of the frame assembly shown in FIG. 11 taken along line 12—12.

FIG. 15 is a side view of a tab and slot configuration used in the frame assembly of the present invention.

FIG. 16 is a side view of a tool of the present invention inserted into the slot shown in FIG. 15 after the tab has been plastically deformed by the tool.

FIG. 17 is a partially sectioned top view of the tool shown in FIG. 16 before the tab has been plastically deformed by the tool.

FIG. 18 is a perspective view of another embodiment of the tool of the present invention.

FIG. 19 is a perspective view of yet another embodiment of the tool of the present invention.

FIG. 20 is a perspective view showing the tool illustrated in FIG. 19 as the tool plastically deforms the tab.

DETAILED DESCRIPTION OF THE PREFERRED EMBODIMENT

The drawings illustrate a conveyor 10 embodying the invention. The conveyor 10 is used to transport articles of production A from one location to another. The conveyor 10 includes an endless modular belt B (shown in phantom in FIG. 1) which is driven along the direction of travel X indicated in FIG. 2 by a conveyor drive motor and sprocket (not shown). The modular belt B has an article bearing surface for supporting the articles A and is supported by a frame assembly 12. In the illustrated embodiment, the conveyor is positioned underneath spraying systems that spray the articles A as they are conveyed by the belt B.

Figure 1:
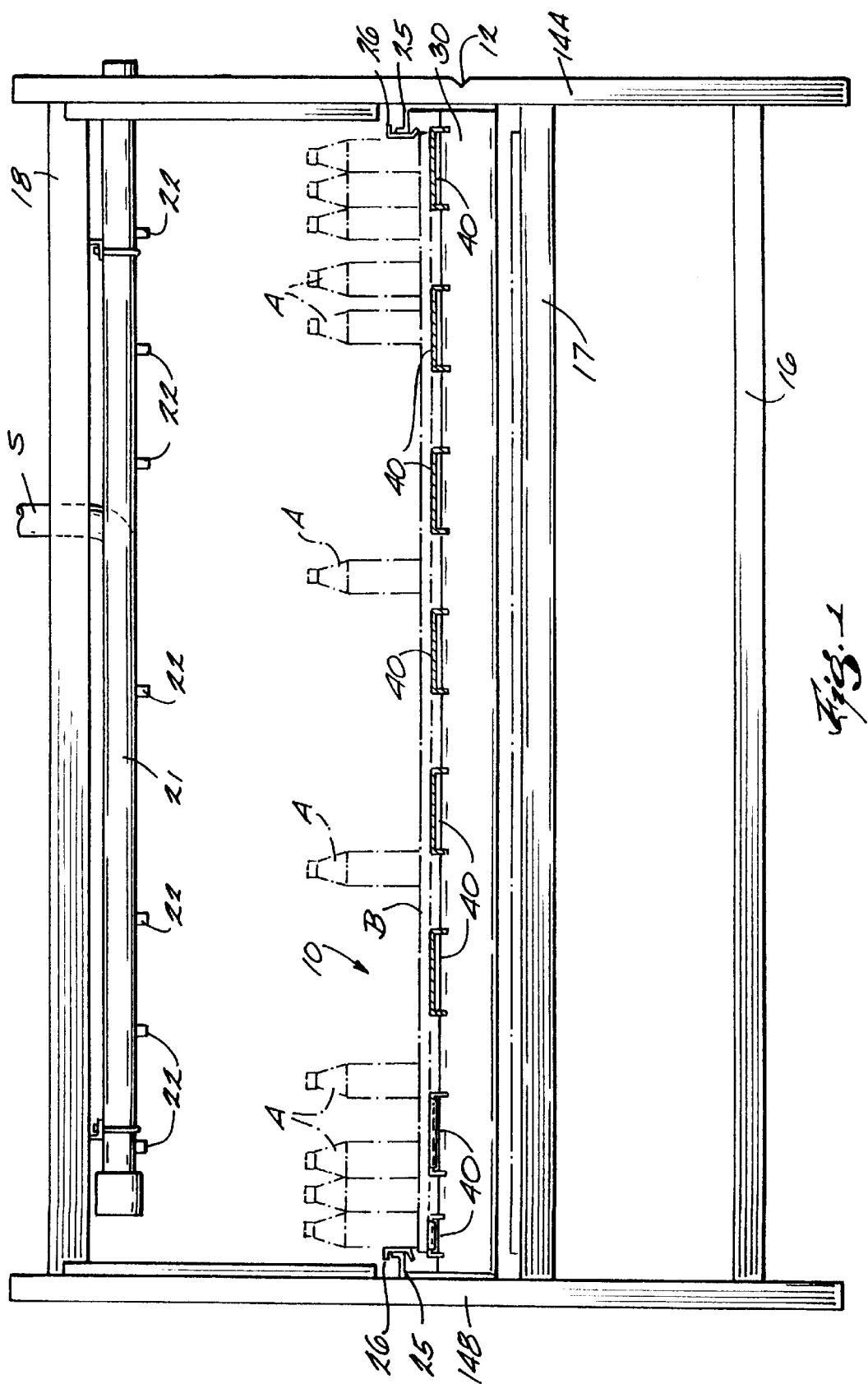
FIG. 1 is an end view of a conveyor that includes a frame assembly embodying the present invention.

As shown in FIGS. 1 and 2, the modular belt B of the conveyor 10 is supported by the frame assembly 12. The frame assembly 12 includes vertical supports 14A, 14B, that are secured together by lower cross members 16, intermediate cross members 17 and upper cross members 18. The conveyor 10 further includes cross channels 30 that extend between the sides of the frame assembly 12. The cross channels 30 support a number of bed channels 40 that extend along the direction of conveyor travel X. The bed channels 40 are also secured to one or more of the cross channels 30, and are preferably secured at opposing ends to two of the cross channels 30. In the illustrated conveyor 10, the spray system S is secured to the upper cross members 18. The spray system S includes a number of distribution pipes 21 (see FIG. 2) that extend laterally across the width of the conveyor 10. Each distribution pipe 21 includes a number of nozzles 22 (see FIG. 1) that spray the articles A.

The conveyor illustrated in FIGS. 1 and 2 is commonly referred to as a bed conveyor because of the number of bed channels 40 extending along the path of the conveyor 10. A bed conveyor is useful when the modular belt B of the conveyor 10 is exceptionally wide because additional bed channels 40 can be added to the frame assembly 12 in order to support the wider modular belts.

Referring now particularly to FIG. 3, the frame assembly 12 includes end pads 25 that are mounted on the opposing ends of the cross channels 30 on both sides of the frame assembly 12 (only one side is shown). Each end pad 25 includes a mounting section 27 that is aligned with the mounting sections 27 of the end pads 25 on the same side of the frame assembly 12. Side wear strips 26 are secured to the mounting sections 27 of each end pad 25 on both sides of the frame assembly 12 so that the wear strips 26 engage the articles of production A as they move along the modular belt B in order to constrain them from moving laterally off of the modular belt B (not shown).

Referring now also to FIGS. 4–7, the cross channels 30 and bed channels 40 are C-shaped. The cross channel 30 includes a number of vertically extending slots 31 that are adapted to receive tabs 41 on the bed channels 40. The assembly of the bed channels 40 to the cross channels 30 occurs by inserting an upper side section 32 of the cross channel 30 into an L-shaped cutout section 42 on a vertical side section 43 of the bed channel 40. Specifically, the upper side section 32 of the cross channel 30 is inserted into a first section 44 of the L-shaped cutout section 42 until a top surface 33 of the upper side section 32 is in contact with an upper surface 45 of the L-shaped cutout section 42. The bed channel 40 is then moved along the direction of belt travel until a front surface 34 of the cross channel 30 comes into contact with an interior surface 46 of the L-shaped cutout section 42. As the front surface 34 of the cross channel 30 is moved into contact with the interior surface 46 of the L-shaped cutout section 42, the tab 41 extends through the slot 31 in the cross channel 30 (see FIGS. 4 and 7).

Once the tab 41 is inserted through the slot 31, the tab 41 is plastically deformed back toward the cross channel 30 in order to couple the bed channel 40 to the cross channel 30. The tab 41 is preferably plastically deformed laterally outward, although the tab 41 can be bent in any direction that facilitates assembly of the bed channel 40 to the cross channel 30. Even though the bed channel 40 is secured to the cross channel 30 by plastically deforming tab 41, the upper surface 33 of the cross channel 30 is the predominate load bearing surface for the bed channel 40.

As shown most clearly in FIGS. 3, 5 and 6 the opposing side 48 of the bed channel 40 includes a similar tab 41 that is inserted to another slot 31 on the cross channel 30. The tab 41 is similarly plastically deformed in order to further couple the bed channel 40 to the cross channel 30.

Although the illustrated frame assembly 12 is shown as including bed channels 40 and cross channels 30, the present invention could be embodied in a frame assembly that includes any conventional base, support or other frame component that is commonly known in the art. The tab and slot configurations could be located on any of the structural components that are part of the frame assembly.

As shown most clearly in FIGS. 8–10 the tab 41 is plastically deformed by using a tool 80. The tool 80 includes a head 81 having a slot 82 that conforms to the shape of the tab 41. The slot 82 is positioned about the tab 41 until a contact surface 83 on the head 81 engages a mating surface 39 on the cross channel 30. The tab 41 is plastically deformed by moving the tool 80 transversely to the tab 41 until an angled surface 84 on the head 81 contacts the mating surface 39.

The tool 80 preferably, although not necessarily, includes a handle 85 that is angled relative to the slot 82. The angle Y between the handle 85 and the head 81 is preferably between 90° and 180° (see FIG. 10). Angling the handle 85 relative to the slot 82 allows the tool 80 to be used in situations where there are constraints on space (as illustrated in FIGS. 8 and 9).

A preferred form of the tool 80 is shown in FIGS. 19 and 20. In this form, one end 89 of a standard pipe 97 is compressed until the interior of the pipe matches the shape of the tab 41. The tool 80 is used in a similar manner by positioning the slot 82 about the tab 41 until a contact surface 83 on the end 89 engages a mating surface 39 on the cross channel 30. The tab 41 is plastically deformed by moving the tool 80 transversely to the tab 41 until an angled surface 84 on the end 89 contacts the mating surface 39 thereby inhibiting further transverse movement of the tool 80.

Another embodiment of the invention is shown in FIGS. 11–14. In this embodiment wear strip brackets 71 are connected to a platform 70 that is part of the frame assembly 12. The wear strip brackets 71 provide support to wear strips 74 that are in contact with the bottom surface 78 of a unit chain link belt B.

Figure 13:
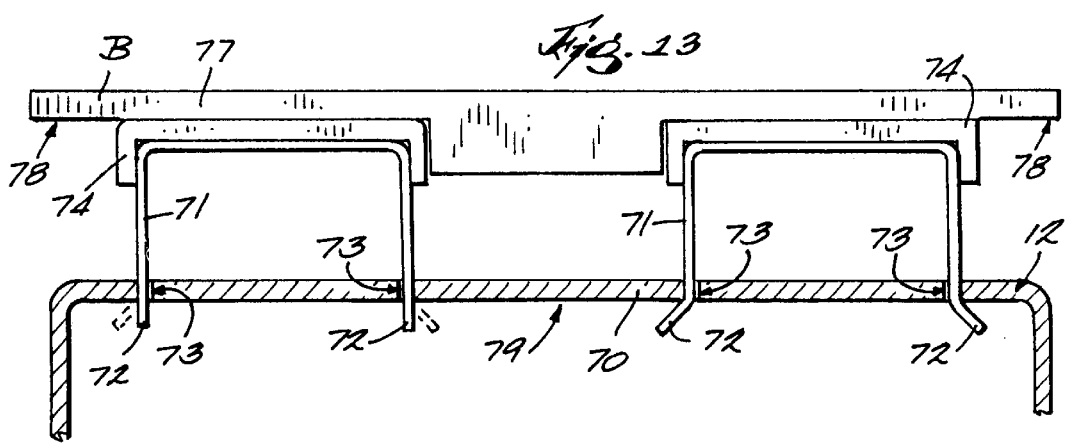
FIG. 13 is a partially sectioned side view of a greater portion of the frame assembly shown in FIG. 11.

Referring now particularly to FIGS. 11–13 a pair of C-shaped wear strip brackets 71 are secured to a platform 70 by inserting tabs 72 into horizontally extending slots 73 on the platform 70 and then plastically deforming the tabs 72 towards the platform 70. The wear strips 74 engage the bottom surfaces 78 on each link 77 in the unit chain link belt B in order to support the unit chan link belt B. The wear strips 74 are preferably made from a low friction material in order to minimize the friction between each link 77 and the wear strips 74 as the unit chain link belt B travels over the wear strips 74.

The slot 73 extends preferably horizontally in the platform 70 along the direction of conveyor travel so that the wear strip brackets 71 and the wear strips 74 also extend along the direction of conveyor travel. Positioning the wear strips 74 in this manner provides support to the unit chain link belt B along the entire length of wear strips 74.

Figure 14:
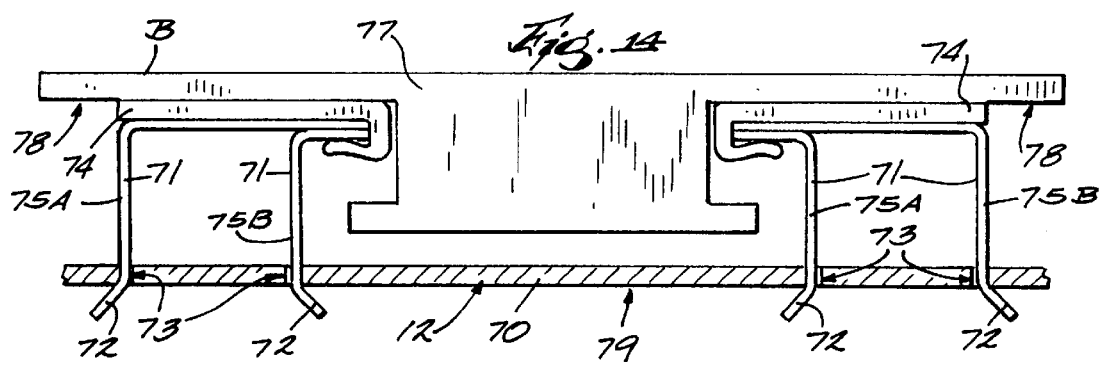
FIG. 14 is a partially sectioned side view illustrating another embodiment of the frame assembly.

FIG. 14 illustrates another form of the wear strip brackets 71. In this form, the wear strip brackets 74 are each comprised of two L-shaped brackets 75A, 75B. Each of the L-shaped brackets 75A, 75B includes a tab 72 that is inserted through a slot 73 in the platform 70.

As shown most clearly in FIGS. 13 and 14, the wear strip brackets 71 are preferably located on opposing sides of each unit chain link 77. It should be noted that the tabs 72 and slot 73 could be positioned anywhere along the length of the unit chain link belt B. In addition, additional wear strip brackets 71 that support additional wear strips 74 may be added to the frame assembly 12 when more than one row of unit chain link belts are placed adjacent to one another or wider chain link belt support is needed.

Another tool 60 for plastically deforming the tab 72 is illustrated in FIGS. 15–18. The tool 60 includes a head 61 that is sized to fit into the remaining portion of the slot 73 that is not occupied by the tab 72. The head 61 of the tool 60 is inserted into the slot 73 from the opposite direction as the tab 72.

During operation of the tool 60, the head 61 is maneuvered further into the slot 73 by impacting a handle 64 toward the slot 73. As the head 61 of the tool 60 moves further into the slot 73, an angled surface 62 on the tool plastically deforms the tab 72 toward the platform 70. The handle 64 of the tool 60 is impacted toward the slot 73 until a stop surface 63 on the tool 60 engages a contact surface 79 on the platform 70.

The slot 73 is preferably elliptical and the tab is correspondingly sized to be slightly longer than the length of the flat sides 89A, 89B on the slot 73. Designing the size of the tab 72 relative to the size of the flat surfaces 89A, 89B on the slot 73 results in a superior connection once the tab 72 is plastically deformed.

The foregoing description of the present invention has been presented for purposes of illustration and description. Furthermore, the description is not intended to limit the invention to the form disclosed herein. Consequently, variations and modifications commensurate with the above teachings, and the scale or knowledge of the relevant art, are within the scope of the present invention. The embodiments described herein are further intended to explain best modes known for practicing the invention and to enable others skilled in the art to utilize the invention in such, or other embodiments and with various modifications required by particular applications or uses of the present invention. It is intended that the appended claims be construed to include alternative embodiments to the extent permitted by the prior art.

What is claimed is:

1. A frame assembly for carrying a conveyor belt, said frame assembly comprising:
   a base including a first slot; and
   a support including a first edge and a cutout section adjacent said first edge such that said cutout section and said first edge define a first tab, said first tab extending through said first slot and being plastically deformed toward said base in order to couple said support to said base.

2. The frame assembly of claim 1 wherein said base includes a second slot and said support includes a second tab extending through said second slot, said second tab being plastically deformed toward said base in order to couple said support to said base.

3. The frame assembly of claim 1 wherein said support is a bed channel that includes a side section having a first edge, said side section further includes a cutout section in communication with said first edge, said cutout section is L-shaped such that said cutout section includes a first section extending perpendicularly inward from said first edge and a second section extending from said first section inward from, and substantially parallel to, said first edge, and said first tab being defined by a portion of said channel located between said second section and said first edge of said side section.

4. The frame assembly of claim 3 wherein said bed channel extends along the direction of conveyor travel.

5. The frame assembly of claim 4 wherein said base includes a cross channel extending laterally to the direction of conveyor travel, said first slot being located in said cross channel.

6. The frame assembly of claim 5 wherein said first slot is vertically oriented such that said cross channel supports said bed channel when said bed channel is coupled to said cross channel.

7. The frame assembly of claim 6 further comprising at least one additional bed channel coupled to said cross channel.

8. The frame assembly of claim 7 further comprising at least one additional cross channel to support said bed channels.

9. The frame assembly of claim 6 wherein said cross channel includes at least one additional slot and said bed channel includes at least one additional tab extending into said slots, said tabs being plastically deformed toward said cross channel in order to couple said bed channel to said cross channel.

10. The frame assembly of claim 1 wherein said base includes a platform extending along the direction of conveyor travel, said platform having a top section bracing said support.

11. The frame assembly of claim 10 wherein said support includes a wear strip bracket and a wear strip mounted to said wear strip bracket, said wear strip bracket includes said first tab which extends through said first slot in said platform.

12. The frame assembly of claim 11 further comprising at least one additional wear strip bracket and wear strip to support the conveyor belt.

13. The frame assembly of claim 11 wherein said platform includes at least one additional slot and said wear strip bracket includes at least one additional tab extending through said slots, said tabs being plastically deformed toward said platform in order to couple said wear strip bracket to said platform.

14. A method of assembling a frame for supporting a conveyor comprising:

providing a base having a first slot;

providing a support that includes a first deflectable tab that is moveable between an undeflected position and a second position;

inserting the first tab on the support into the slot, the first tab being in the undeflected position; and coupling the support to the base by plastically deforming the first tab toward the second position.

15. The method of assembling a frame for supporting a conveyor as claimed in claim 14 wherein said step of inserting a tab further includes the steps of;

positioning an L-shaped cutout section on the support near the base, inserting the base into a first section of the L-shaped cutout section that extends perpendicularly inward from a first edge of the support, and maneuvering the base into a second section of the L-shaped cutout section that extends inward from, and substantially parallel to, the first edge of the support such that the first tab moves into the first slot.

16. The method of assembling a frame for supporting a conveyor as claimed in claim 14 wherein said step of coupling the support to the base by plastically deforming the first tab toward the base further includes the steps of;

inserting a tool into the slot adjacent to the first tab, and impacting the tool further into the first slot to plastically deform the tab with an angled section of the tool.

17. The method of assembling a frame for supporting a conveyor as claimed in claim 14 wherein said step of coupling the support to the base by plastically deforming the first tab toward the base further includes the steps of;

positioning a head of a tool about the first tab, maneuvering a handle on the tool transverse to the first tab to plastically deform the first tab toward the base.

18. The method of assembling a frame for supporting a conveyor as claimed in claim 17 wherein the handle of the tool is maneuvered transverse to the first tab until an angled section of the tool contacts the base.

19. A frame assembly for carrying a conveyor belt, said frame assembly comprising:

a base including a first slot; and a support including a first tab extending through said first slot, said first tab being plastically deformed toward said base in order to couple said support to said base, wherein said support is a bed channel that includes a side section having a first edge, said side section further includes a cutout section in communication with said first edge, said cutout section is L-shaped such that said cutout section includes a first section extending perpendicularly inward from said first edge and a second section extending from said first section inward from, and substantially parallel to, said first edge, and said first tab being defined by a portion of said channel located between said second section and said first edge of said side section.

20. The frame assembly of claim 19 wherein said bed channel extends along the direction of conveyor travel.

21. The frame assembly of claim 20 wherein said base includes a cross channel extending laterally to the direction of conveyor travel, said first slot being located in said cross channel.

22. The frame assembly of claim 21 wherein said first slot is vertically oriented such that said cross channel supports said bed channel when said bed channel is coupled to said cross channel.

23. The frame assembly of claim 22 further comprising at least one additional bed channel coupled to said cross channel.

24. The frame assembly of claim 23 further comprising at least one additional cross channel to support said bed channels.

25. The frame assembly of claim 22 wherein said cross channel includes at least one additional slot and said bed channel includes at least one additional tab extending into said slots, said tabs being plastically deformed toward said cross channel in order to couple said bed channel to said cross channel.

26. A method of assembling a frame for supporting a conveyor comprising:

providing a base having a first slot;

positioning an L-shaped cutout section on the support near the base;

inserting the base into a first section of the L-shaped cutout section that extends perpendicularly inward from a first edge of the support;

maneuvering the base into a second section of the L-shaped cutout section that extends inward from, and substantially parallel to, the first edge of the support such that the first tab moves into the first slot; and coupling the support to the base by plastically deforming the first tab toward the base.

27. A method of assembling a frame for supporting a conveyor comprising:

providing a base having a first slot;

inserting a first tab on a support into the slot;

inserting a tool into the slot adjacent to the first tab; and impacting the tool further into the first slot to plastically deform the tab with an angled section of the tool.

28. A method of assembling a frame for supporting a conveyor comprising:

providing a base having a first slot;

inserting a first tab on a support into the slot;

positioning a head of a tool about the first tab;

maneuvering a handle on the tool transverse to the first tab to plastically deform the first tab toward the base.

29. The method of assembling a frame for supporting a conveyor as claimed in claim 28 wherein the handle of the tool is maneuvered transverse to the first tab until an angled section of the tool contacts the base.

* * * * *